(12) United States Patent
Hodge

(10) Patent No.: US 9,405,079 B2
(45) Date of Patent: Aug. 2, 2016

(54) CONNECTOR WITH INTERFACE PROTECTION

(71) Applicant: Molex, LLC, Lisle, IL (US)

(72) Inventor: Malcolm H. Hodge, Chicago, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/757,763

(22) Filed: Dec. 23, 2015

(65) Prior Publication Data

US 2016/0124158 A1     May 5, 2016

Related U.S. Application Data

(62) Division of application No. 14/220,780, filed on Mar. 20, 2014, now Pat. No. 9,223,095.

(60) Provisional application No. 61/804,006, filed on Mar. 21, 2013.

(51) Int. Cl.
*G02B 6/38*     (2006.01)
*G02B 6/44*     (2006.01)
*B82Y 20/00*     (2011.01)

(52) U.S. Cl.
CPC .............. *G02B 6/389* (2013.01); *G02B 6/3853* (2013.01)

(58) Field of Classification Search
CPC .. G02B 6/4494; G02B 6/4475; G02B 6/3821; G02B 6/3825; G02B 6/3861; G02B 6/3869; G02B 6/3887; G02B 6/0008
USPC .......................... 385/58–67, 88–90, 100, 147
See application file for complete search history.

(56) References Cited

U.S. PATENT DOCUMENTS

| | | | |
|---|---|---|---|
| 4,616,900 A | 10/1986 | Cairns | |
| 5,116,329 A | 5/1992 | Vannus et al. | |
| 5,971,784 A | 10/1999 | Fabian et al. | |
| 6,475,008 B1 | 11/2002 | Marolda et al. | |
| 6,719,927 B2 | 4/2004 | Sakurai et al. | |
| 6,929,404 B2 | 8/2005 | Jones et al. | |
| 7,241,057 B2 * | 7/2007 | Koreeda | G02B 6/3849 385/139 |
| 7,618,198 B2 | 11/2009 | Baxter et al. | |
| 8,876,404 B2 | 11/2014 | Rossman | |
| 8,944,841 B2 | 2/2015 | YuQiang et al. | |
| 2006/0210224 A1 * | 9/2006 | Koreeda | G02B 6/3849 385/70 |
| 2014/0286609 A1 * | 9/2014 | Hodge | G02B 6/3817 385/59 |
| 2014/0341510 A1 * | 11/2014 | Hodge | G02B 6/3885 385/60 |

* cited by examiner

*Primary Examiner* — Akm Enayet Ullah
(74) *Attorney, Agent, or Firm* — Jeffrey K. Jacobs

(57) ABSTRACT

An assembly includes a first cable assembly with a first housing having a first mating face and a retention member. A first ferrule has a plurality of first optical fibers positioned therein. A first beam expanding element is generally aligned with each first optical fiber, and each first beam expanding element expands an optical beam generally to a beam diameter. A second cable assembly including a second housing with a second mating face. A second ferrule has a plurality of second optical fibers positioned therein. A second beam expanding element is generally aligned with each second optical fiber, and each second beam expanding element expands an optical beam generally to the beam diameter. A second retention member interacts with the first retention member to retain the first cable assembly to the second cable assembly.

10 Claims, 17 Drawing Sheets

CONNECTOR WITH INTERFACE PROTECTION

CROSS REFERENCE TO RELATED APPLICATIONS

This patent application is a divisional of U.S. Ser. No. 14/220,780, filed 20 Mar. 2014, which is incorporated by reference in its entirety and which claims priority to prior-filed U.S. Provisional Patent Application No. 61/804,006, entitled "Connector With Interface Protection," filed on 21 Mar. 2013 with the United States Patent And Trademark Office. The content of U.S. Provisional Patent Application No. 61/804,006 is also fully incorporated in its entirety herein.

BACKGROUND OF THE PRESENT DISCLOSURE

The Present Disclosure relates, generally, to connector systems and, more particularly, to a connector system having a structure for limiting access to the mating face of the connector system during or after mating of the connector system.

Optical and electrical assemblies are often interconnected as part of a larger system. In some situations, the interface of the assemblies may be damaged, or the optical or electrical paths interrupted or degraded by contaminants or debris that may enter the interface during or after the process of mating or bringing the assemblies together. For example, in some applications, the end faces of mating optical fibers physically contact one another to effect signal transmission between the mating optical fiber pair. Various factors may reduce the efficiency of the light transmission between the optical fiber pair such as irregularities, burrs or scratches in the fiber end faces, misalignment of the fibers as well as dust or debris between the fibers at the mating interface. Removable dust covers are typically used to prevent physical damage to the interfaces.

Operating within or under water is another environment that presents challenges for optical fiber interconnect systems. Some systems use complex sealing configurations that attempt to maintain a watertight seal around the optical interface. Such sealing configurations are often expensive and may result in significant signal loss in case of a sealing failure.

Expanded beam optical fiber connectors are often used in dirty and/or high vibration environments. Due to the small optical path relative to the size of any foreign objects such as dust or debris, almost any foreign objects located within the optical transmission path will interfere with light transmission. Expanded beam optical connectors expand the width of the optical beam and transmit the expanded beam over an air gap between mating connectors. In doing so, the relative size difference between any foreign object and the optical path is increased; thus reducing the impact of any such foreign object on the efficiency of the light transmission.

Aspects of the conventional systems may be improved upon to present a less complicated, more reliable system.

SUMMARY OF THE PRESENT DISCLOSURE

An optical fiber assembly for mating with a mating component along a mated axis is provided. In one aspect, the optical fiber assembly includes a housing with a mating face for mating with the component, and defining a housing axis. A ferrule has a plurality of optical fibers positioned therein and a front face. A cover is slidably mounted on the housing adjacent the mating face. A mating guide is positioned at an angle to the housing axis to guide relative movement of the housing from a first operative position, at which the housing axis is spaced from the mated axis, to a second operative position, at which the housing axis is generally aligned with the mated axis.

In another aspect, an assembly includes a first cable assembly and a second cable assembly. The first cable assembly has a first housing with a first mating face, a first cover positioned adjacent the first mating face, a first housing axis and a first mating guide at an angle to the housing axis. The second cable assembly has a second housing with a second mating face for positioning generally adjacent the first mating face, a second cover positioned adjacent the second mating face, a second housing axis and a second mating guide at an angle to the second housing axis. The first and second mating guides slidingly engage each other to guide relative movement of the first and second cable assemblies from a first operative position at which the first housing axis is spaced from and generally parallel to the second housing axis to a second operative position at which the first housing axis and the second housing axis are generally aligned and the first mating face is generally adjacent the second mating face.

In another aspect, a method of mating a pair of connector assemblies includes providing a first connector assembly having a first housing with a first mating face, a first cover positioned generally adjacent the first mating face and a first housing axis. A second connector assembly is provided having a second housing with a second mating face, a second cover positioned generally adjacent the second mating face and a second housing axis. The first and second connector assemblies are positioned in an offset position with the first and second housing axes being generally parallel and spaced apart. The first and second connector assemblies are moved relative to each other at an angle to the first and second housing axes to slide the first cover away from the first mating face, slide the second cover away from the second mating face, align the first and second axes and position the mating first and second mating faces generally adjacent each other.

In still another aspect, an assembly includes a first cable assembly with a first housing having a first mating face and a retention member. A first ferrule has a plurality of first optical fibers positioned therein. A first beam expanding element is generally aligned with each first optical fiber, and each first beam expanding element expands an optical beam generally to a beam diameter. A second cable assembly including a second housing with a second mating face. A second ferrule has a plurality of second optical fibers positioned therein. A second beam expanding element is generally aligned with each second optical fiber, and each second beam expanding element expands an optical beam generally to the beam diameter. A second retention member interacts with the first retention member to retain the first cable assembly to the second cable assembly with the first mating face and the second mating face being positioned a distance apart no more than approximately 25% of the beam diameter. The first cable assembly being slidable relative to the second cable assembly.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
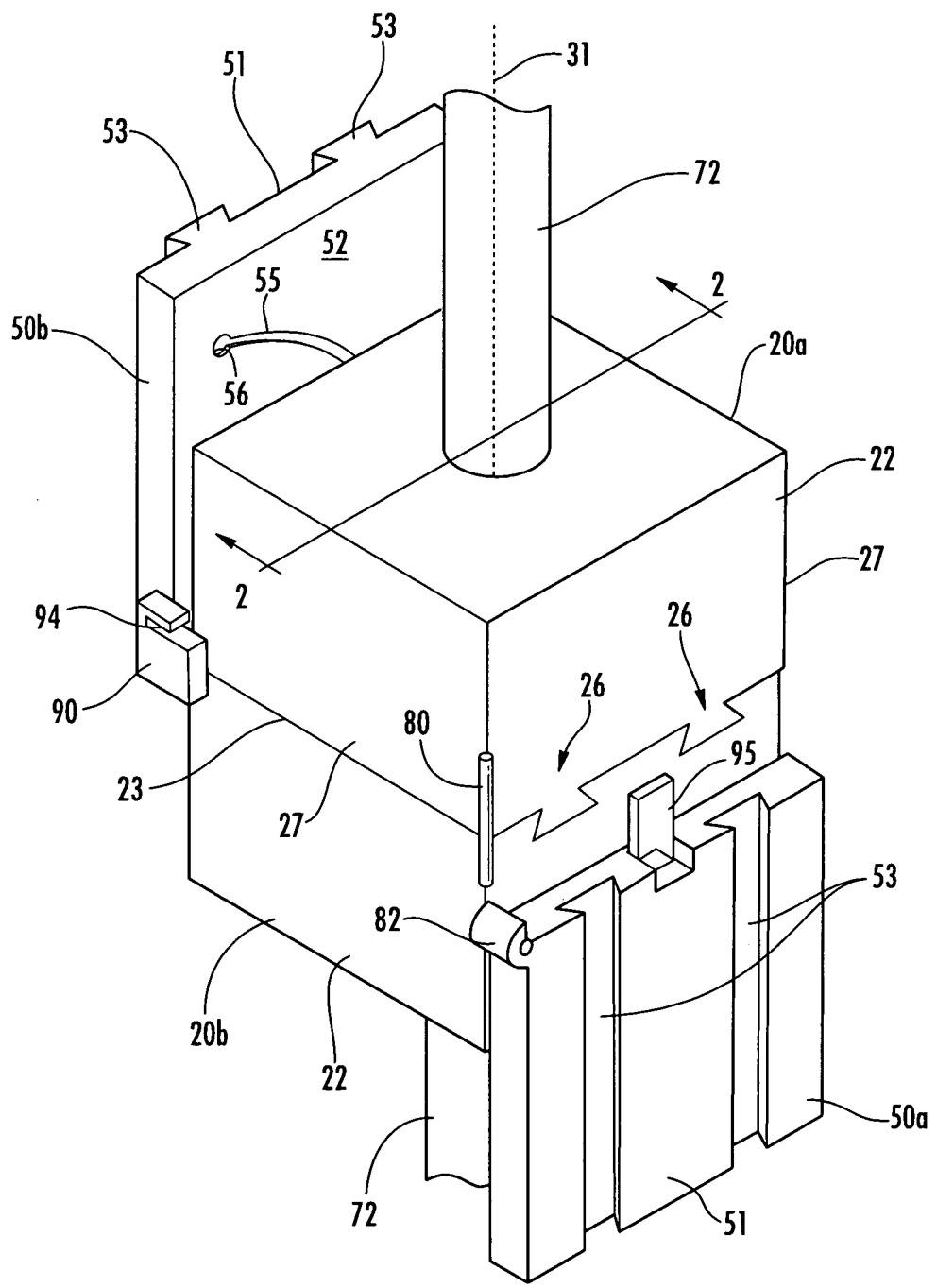
FIG. 1 is a perspective view of a pair of mating cable assemblies in accordance with the Present Disclosure.
Figure 2:
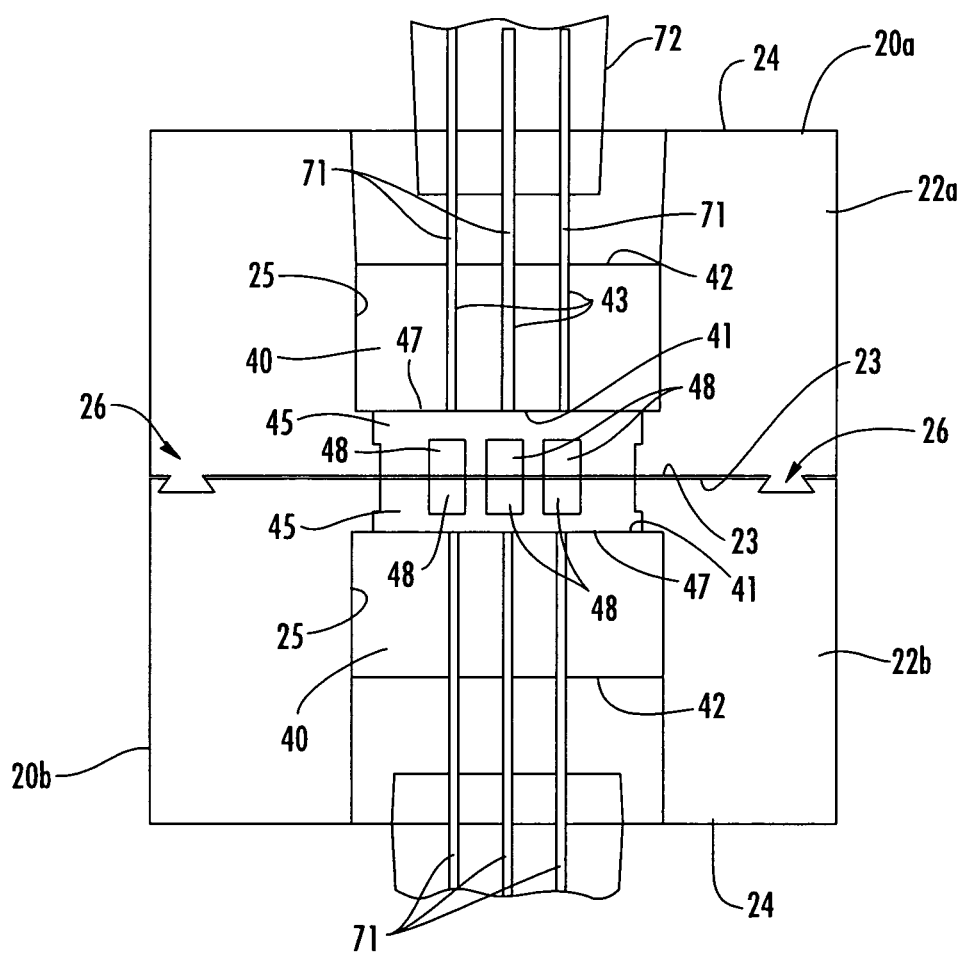
FIG. 2 is a section view of a pair of mating connectors taken generally along Line 2-2 of FIG. 1.

Referring to FIGS. 1-2, a first or upper expanded beam optical fiber cable assembly 20a and a second or lower expanded beam optical fiber cable assembly 20b are depicted. Inasmuch as the cable assemblies are substantially identical, they are sometimes referred to herein generically as a cable assembly 20. The components of each cable assembly 20 may be substantially identical unless otherwise described herein and the description of like components may not repeated for both the upper and lower cable assemblies 20a, 20b. Each cable assembly 20 includes a body or housing 22 with a housing axis 30. The cable assemblies 20 further include a ferrule 40 for securing a plurality of optical fibers 71 of a multi-fiber cable 72 and may include a light or beam expanding element such as lens plate 45. When mated, the cable assemblies 20 are aligned along a mated axis 31. By utilizing an optical fiber system with lenses, light may be transmitted as an expanded beam to minimize the necessity for exact alignment of the mating optical fiber cable assemblies 20. In addition, utilizing an expanded beam interface also minimizes the impact of any foreign objects within the optical path.

Figure 3:
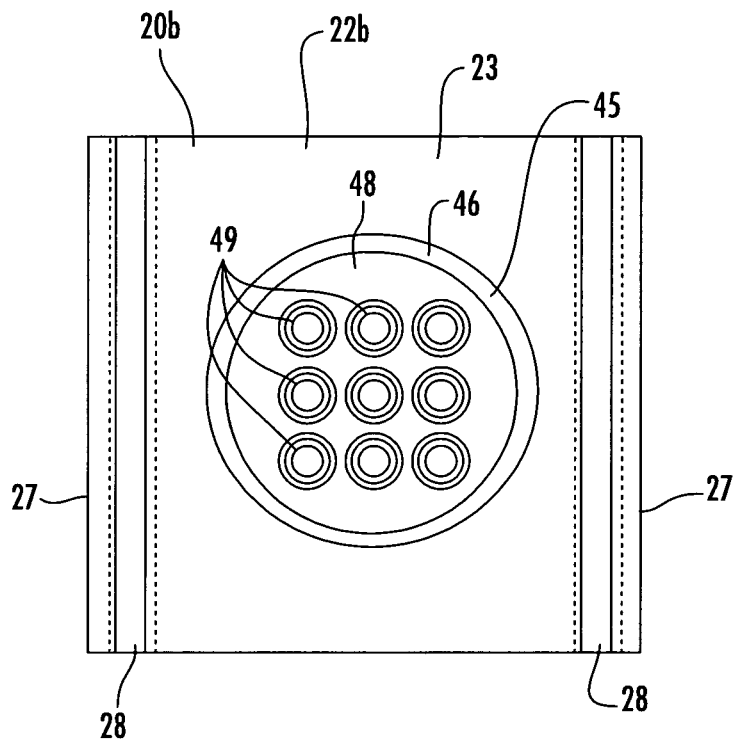
FIG. 3 is a top plan view of one of the cable assemblies of FIG. 1.

Housing 22 may be generally rectangular and has a generally flat front or mating face 23, a generally flat rear face 24 and a cavity 25 therebetween in which ferrule 40 and lens plate 45 are positioned. Ferrule 40 may be generally cylindrical (FIG. 3) and has a generally flat front face 41, and a generally flat rear face 42. As depicted, ferrule 40 includes three rows of three generally cylindrical optical fiber receiving holes or bores 43 that extend through the ferrule from rear face 42 to front face 41. Housing 22 and ferrule 40 may be formed of a variety of materials including metals or resins. In one embodiment, housing 22 may be formed of a ferromagnetic material such as Series 400 stainless steel.

Lens plate 45 is generally cylindrical and has a front face 46 and a generally flat rear face 47. Lens plate 45 includes a plurality of beam expanding elements such as the lens elements indicated schematically at 48. One lens element 48 is aligned with the end face of each optical fiber 71 to create a lens array of spaced apart lens elements within the lens plate 45. The rear face 47 of lens plate 45 is positioned adjacent the front face 41 of ferrule 40. Lens plate 45 may be formed of an optical grade resin capable of being injection molded and, if desired, may have a refractive index closely matching that of the optical fibers 71. In an example in which the cable assemblies 20 are used under water, it may be desirable to form all or a portion of the lens plate 45 of a material with a refractive index closely matching that of water.

The lens elements 48 may take a variety of forms. In one example, the lens elements 48 may be graded index lenses or another type of lens configuration that permits the front face 46 of the lens plate 45 to be generally flat as depicted in FIG. 2. A flat front face 46 may be desirable in some applications to provide flexibility in the environment in which the cable assemblies 20 are used. For example, a convex lens is typically designed or chosen based upon the medium between aligned lenses through which light will travel. As such, convex lenses designed for use in air will not necessarily perform as well if used under water. When using a flat front face 46, changes in the medium between aligned lens elements 48 will have less of an impact on the light passing through a flat front face 46 of the lens plate 45 as the light will already be collimated as it passes through the medium. In some applications, conventional geometric lenses may be used. However, such conventional lenses may require the lens elements 48 to be configured specifically for the medium between aligned lens elements in order to optimize performance.

The front face 46 of lens plate 45 may be positioned immediately adjacent the mating face 23 of housing 22 to minimize the distance between the front faces 46 of aligned lens plates 45 of a mating pair of cable assemblies 20. As such, the front face 46 of lens plate 45 may be considered a portion of the mating face 23. Minimizing the distance between the front faces 46 and utilizing a lens plate 45 with a flat front face will reduce the likelihood that foreign objects will enter the space between the lens plates 45. Through such a configuration, a "zero volume" assembly may be created that minimizes the volume of the medium between the lens plates 46, but without the need for the complexity of seals sometimes used to seal a mating interface.

In one example, cable assemblies 20 may be configured so that the distance between the front faces 46 of lens plates 45 is approximately 10% or less of the diameter of the expanded beam as it passes through the medium between the lens plates (i.e., the spot size of the expanded beam). As a result, foreign objects larger than 10% of the diameter of the expanded beam will be unable to fit between the lens plates 45 and the aligned lens elements 48. Objects smaller than 10% of the beam diameter may enter the interface between the lens plates 45 but their impact may not be significant due to their relatively small size. In other applications, the distance between the front faces 46 of the lens plates 45 may be larger (e.g., 25% or more) or smaller (e.g., 5-10%) depending upon the desired performance and the level of precision of the mechanical aspects of the cable assemblies 20. As an example, an expanded beam may have a diameter of between approximately 250-500 microns. It is believed that with an acceptable level of precision of the mechanical components, a gap of approximately 60 microns between the front faces 46 of lens plates 45 may be maintained. In such example, the gap would range between 12% and 24% of the diameter of the expanded beam passing through the medium.

Figure 4:
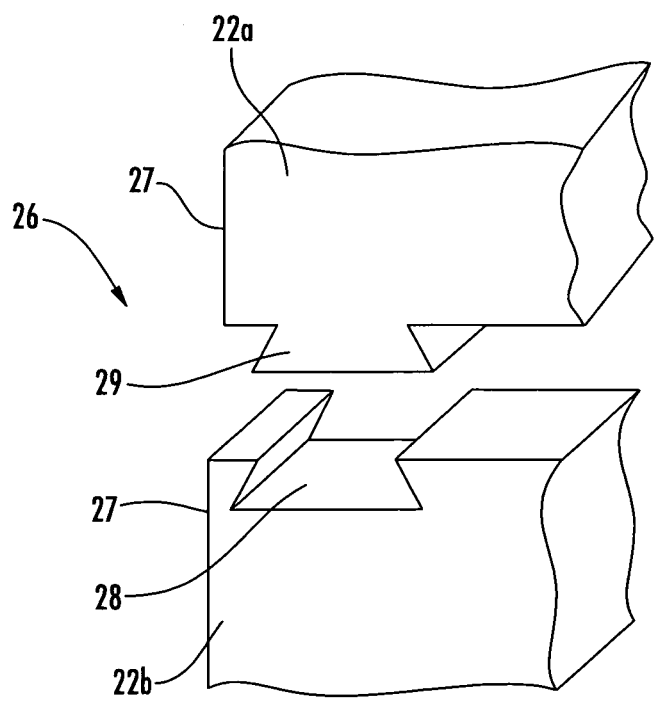
FIG. 4 is an enlarged fragmented sectional view of interengaging guide members of the pair of mating cable assemblies of FIG. 1.

The mating face 23 of housing 22 includes a pair of mating guides such as rails or sliding guide members 26 that extend generally parallel to and generally along each sidewall 27 of the housing. Guide members 26 facilitate and guide relative linear sliding movement of the pair of cable assemblies 20 from the laterally offset position depicted in FIG. 9 to the mated position depicted in FIG. 1. As depicted, guide members 26 have a dovetail cross-section (FIG. 4) with one housing such as lower housing 22b having a dovetail channel 28 along one sidewall 27 and the other housing such as upper housing 22a having a dovetail projection 29 along its sidewall. Upon sliding the mating cable assemblies 20 from the laterally offset position of FIG. 9 to the mated position of FIG. 1, the interlocking channels 28 and projections 29 of the guide members 26 will secure the cable assemblies together. If desired, housings 22 of cable assemblies 20 may be configured differently (e.g., each housing may have one dovetail channel 28 and one dovetail projection 29). In addition, other shapes of interlocking channels and projections may be used such as those having a T-shaped cross-section. Further, guide members 26 may function to guide the two housings 22 without an interlocking cross-section in which case additional structure or components may be used to retain the cable assemblies 20 together when in a mated condition.

Referring to FIGS. 5-9, a generally rectangular cap or cover 50 abuts the mating face 23 of each housing 22 in order to enclose and protect the optical fiber interface including lens elements 49. Cover 50 has a generally planar interface surface 51 configured to be positioned adjacent to the mating face 23 of housing 22 and a generally planar engagement surface 52 opposite the interface surface 51. The cover 50 may be configured so that the distance between the mating face 23 (including front face 46 of lens plate 45) and the interface surface 51 of cover 50 may be minimized. Through such a configuration, the likelihood that foreign objects will enter the space between the cover 50 and each of the mating face 23 and the lens plate 45 is reduced. As described above with respect to the distance between the front faces 46 of lens plates 45, it may be desirable to maintain the distance between the mating face 23 (including lens plate 45) and the interface surface 51 of cover 50 at approximately 10% or less of the diameter of the expanded beam as it passes through the medium between lens plates. As further described above, other distances and ratios may be used. It may be desirable for the distance between the front faces 46 of lens plates 45 of a mated pair of cable assemblies 20 to match the distance between the mating face 23 (including the lens plate 45) and the interface surface 51.

Interface surface 51 includes a pair of mating guides such as rails or guide members 53 positioned along the interface surface 51 and configured to intermate with the guide members 26 of housing 22 to permit cover 50 to slide linearly along mating face 23 of housing 22. As depicted, guide members 53 of each cover 50 are generally parallel, have complimentary cross-sections with the guide members 26 of each respective housing 22, and the distance between the guide members 53 on interface surface 51 of each cover 50 generally corresponds to the distance between the guide members 26 of its housing 22. As a result of the interlocking cross-sections of the guide members 26, 53, the covers 50 may only move relative to its cable assembly 20 along the guide members 26 of the housing 22.

Figure 5:
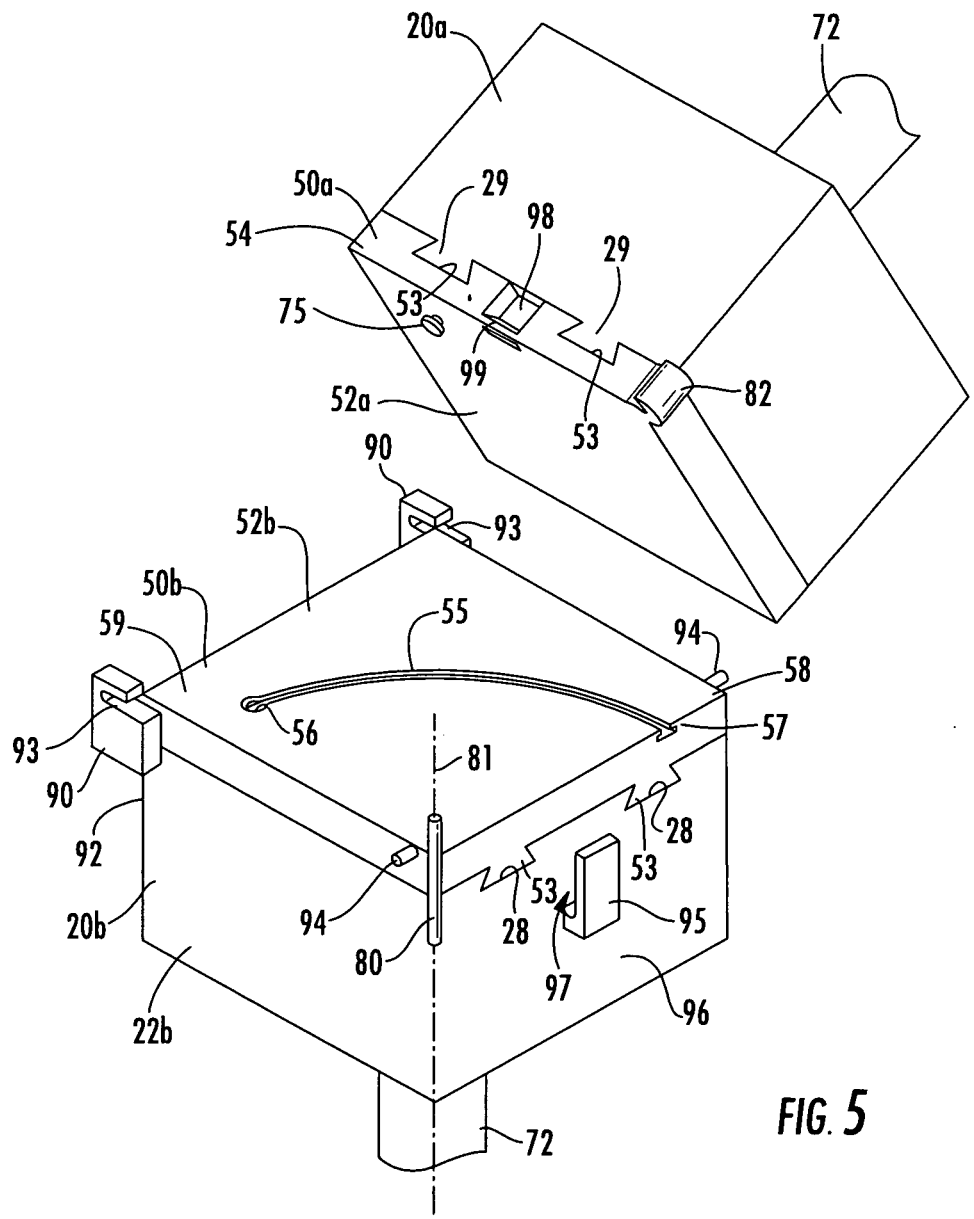
FIG. 5 is a perspective view of the mating cable assemblies of FIG. 1 with covers mounted thereon and one assembly rotated for clarity.
Figure 12:
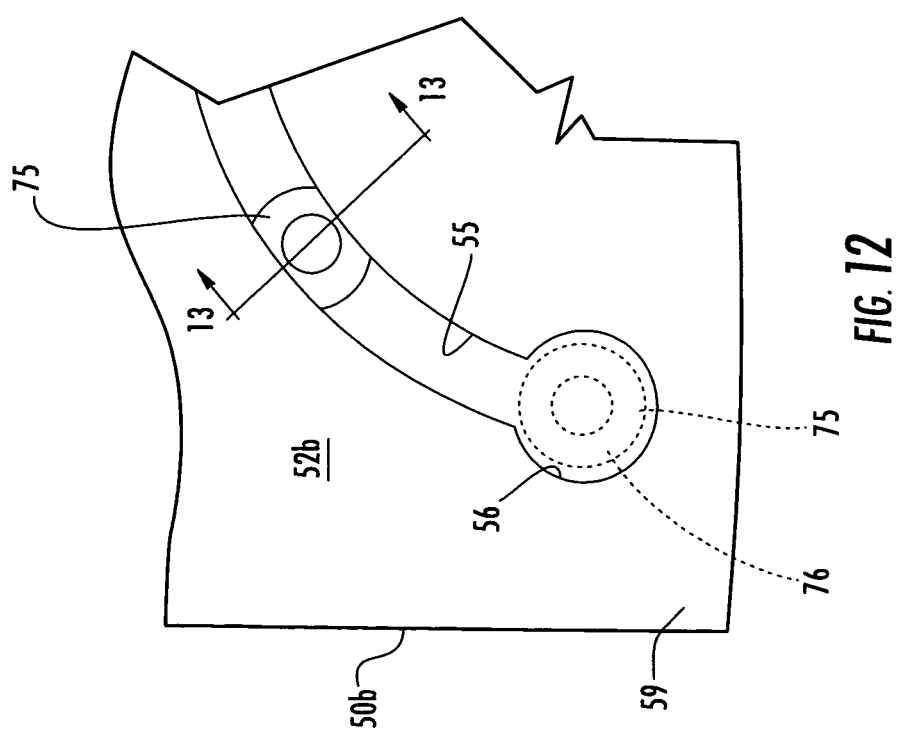
FIG. 12 is a fragmented plan view of the interaction between the upper cover and the lower cover.
Figures 14, 15, 16:
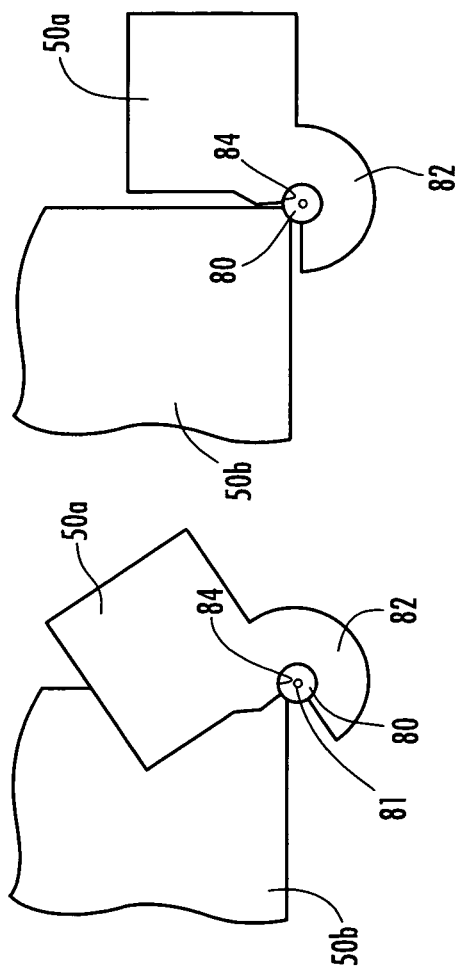
FIG. 14 is a fragmented sectional view of a portion of the second alignment and rotational guide in a first position corresponding to that of FIG. 6.
FIG. 15 is a fragmented sectional view of the portion of the second alignment and rotational guide but with the position corresponding to that of FIG. 7.
FIG. 16 is a fragmented sectional view of the portion of the second alignment and rotational guide of FIG. 14 but with the position corresponding to that of FIG. 8.

The engagement surface 52 of each cover 50 is provided with one half of a first alignment and rotational guide to facilitate initial alignment and subsequent rotation of two mating cable assemblies 20. As best seen in FIG. 5, upper cover 50a of the upper cable assembly 20a (as viewed in the Figures) includes a rotation projection in the form of a generally cylindrical shoulder bolt 75 mounted on and projecting from engagement surface 52a and located generally adjacent guide corner 54 of the engagement surface. Bolt 75 has an enlarged generally cylindrical head 76 (FIGS. 12-3) and a cylindrical shaft 77 having a cross-section smaller than that of head 76 extending between engagement surface 52a and the head.

Figure 13:
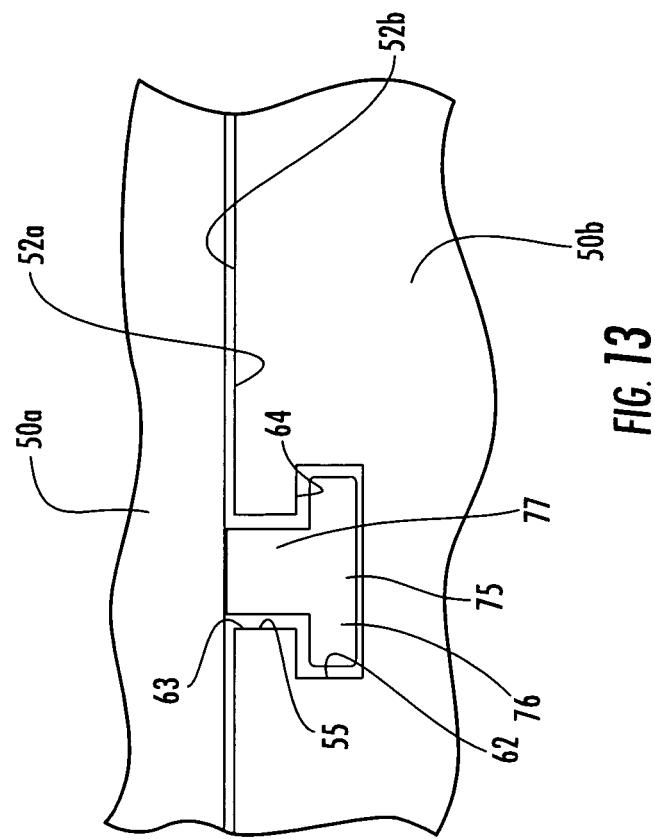
FIG. 13 is a section taken generally along Line 13-13 of FIG. 12.

Lower cover 50b of the lower cable assembly 20b includes an arcuate or curved slot or channel 55 in engagement surface 52b extending from circular opening 56 to exit edge 57 of lower cover 50b generally adjacent exit corner 58. Opening 56 is located generally adjacent entry corner 59 of lower cover 50b and dimensioned to receive cylindrical head 76 of bolt 75 therein (shown in phantom in FIG. 12). As best seen in FIG. 13, channel 55 has an inverted T-shaped cross-section and a relatively wide base 62 that receives and guides head 76 of bolt 75 therein, and a relatively narrow opening 63 that receives and guides shaft 77 of bolt 75. A pair of undercut retention shoulders 64 adjacent engagement surface 52 of lower cover 50b prevent bolt 75 from disengaging from lower cover 50b except at opening 56 and exit edge 57. As such, head 76 of bolt 75 is retained in channel 55 during the rotation of upper cover 50a relative to lower cover 50b.

A second alignment and rotational guide includes components located on one of the housing 22 and both of the covers 50. More specifically, the lower housing 22b of the lower cable assembly 20b has a cylindrical guide shaft 80 at one sidewall 27 adjacent a corner and extending past mating face 23. When lower cover 50b is positioned on cable assembly 20 as depicted in FIG. 5, guide shaft 80 is positioned adjacent exit edge 57 of lower cover 50b and defines the axis of rotation 81 of the arcuate channel 55.

Figure 8:
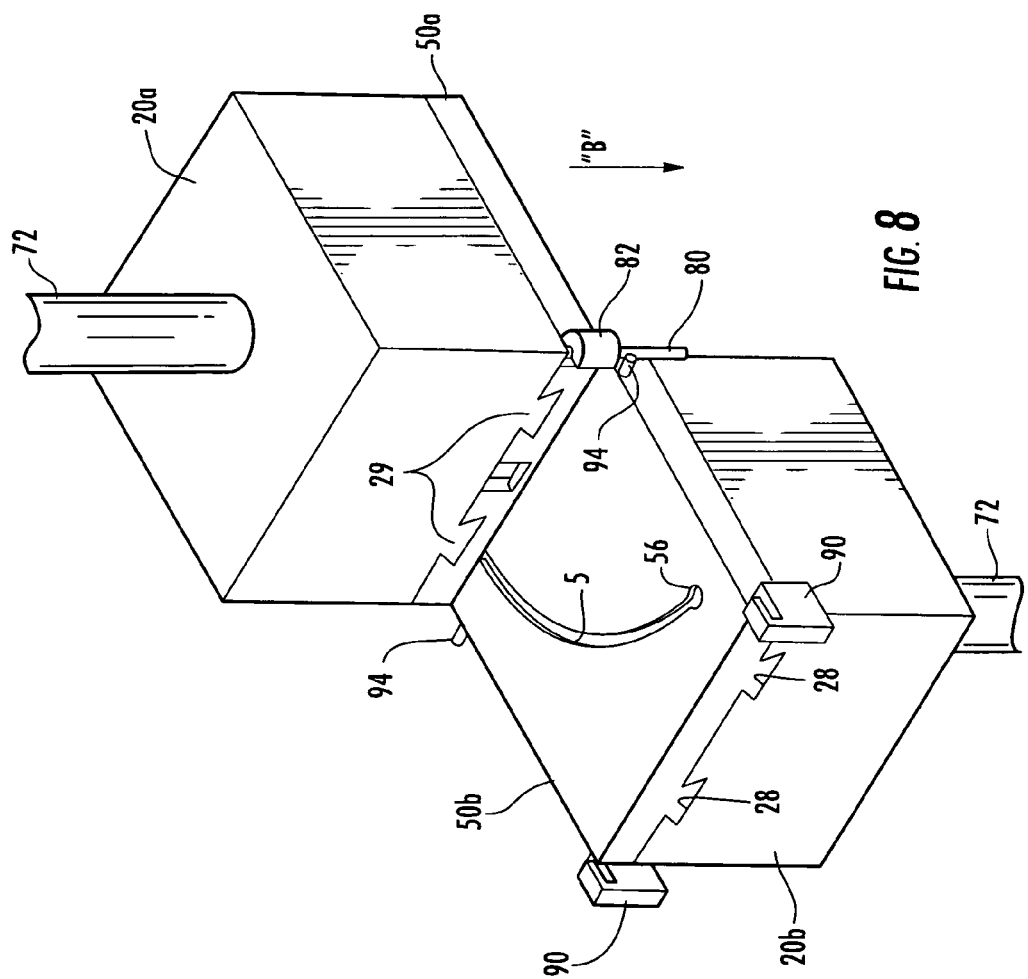
FIG. 8 is a perspective view of the pair of cable assemblies and covers of FIG. 7 with the upper cable assembly and cover fully rotated off of the lower connector and cable assembly.
Figure 9:
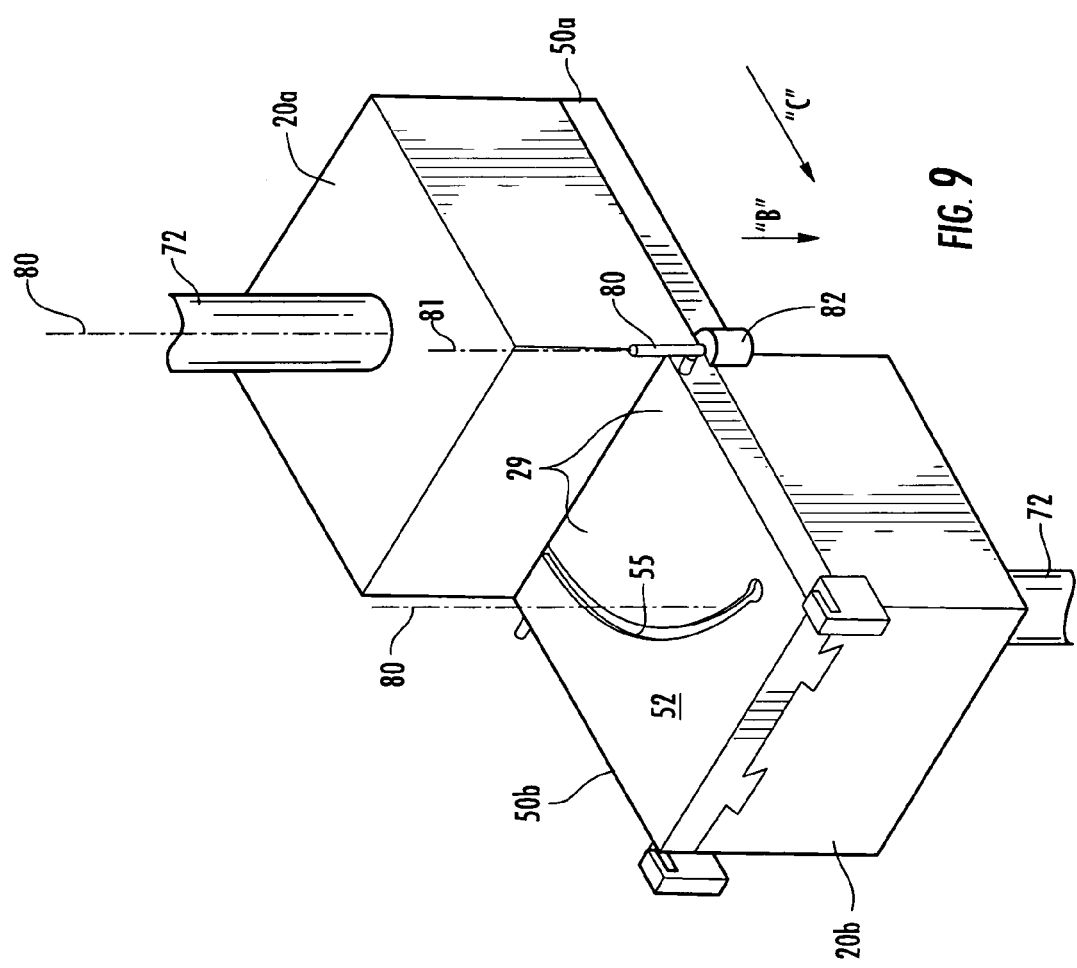
FIG. 9 is a perspective view similar to that of FIG. 8 with the upper cable assembly and cover moved downward relative to the lower cable assembly and cover.

The upper cover 50a of the upper cable assembly 20a includes a semi-cylindrical socket or guide member 82 which receives cylindrical guide shaft 80 therein to align the upper and lower cable assemblies and facilitate rotation therebetween. Guide member 82 has an arcuate inner surface 84 that engages the outer surface of guide shaft 80 to assist in the alignment of the upper and lower cable assemblies 20a, 20b and guide the rotation therebetween. The engagement of head 76 of bolt 75 with arcuate channel 55 prevents relative linear movement of the upper and lower covers 50a, 50b, and thus the upper and lower cable assemblies 20a, 20b, until the head 76 exits the channel 75 at exit edge 57, as depicted in FIGS. 8-9.

Figure 11:
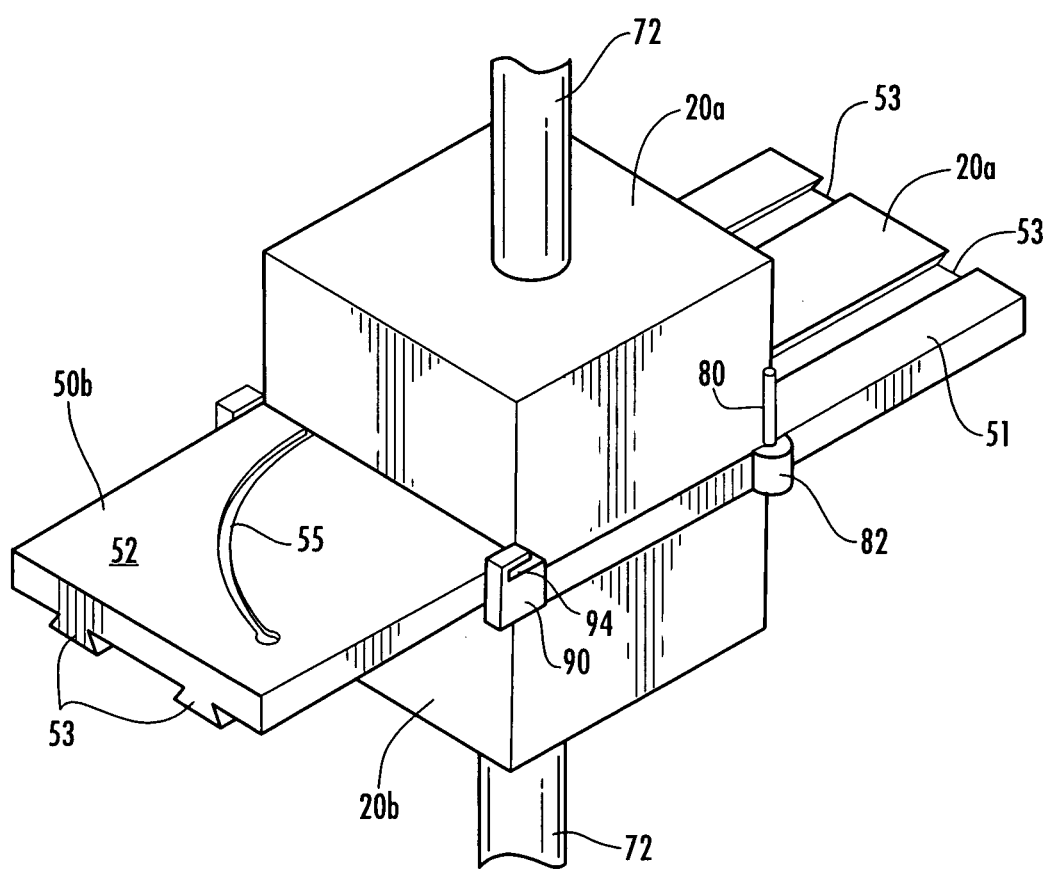
FIG. 11 is a perspective view of the upper and lower cable assemblies and covers with the upper cable assembly aligned with the lower cable assembly.

A cover pivot guide structure is provided on each housing 22 for guiding the rotation of the covers 50 once the pair of upper and lower cable assemblies 20a, 20b have been mated. As depicted, the lower housing 22b of the lower cable assembly 20b has a pair of spaced apart guide blocks 90 positioned along a rotational edge 92 of the housing. Each guide block has a horizontally opening slot 93 that opens towards exit edge 57 and is oriented generally parallel to the guide members 26 of the housing. Lower cover 50b of the lower cable assembly 20b has a pair of oppositely projecting, horizontal guide posts 94 that are dimensioned to be received in the horizontally opening slots 93. The slots 93 and guide posts 94 are dimensioned so that each guide post 94 can slide into its respective slot 93 and rotate therein when the lower cover 50b is slid laterally to its mated position as depicted in FIG. 11.

Figure 17:
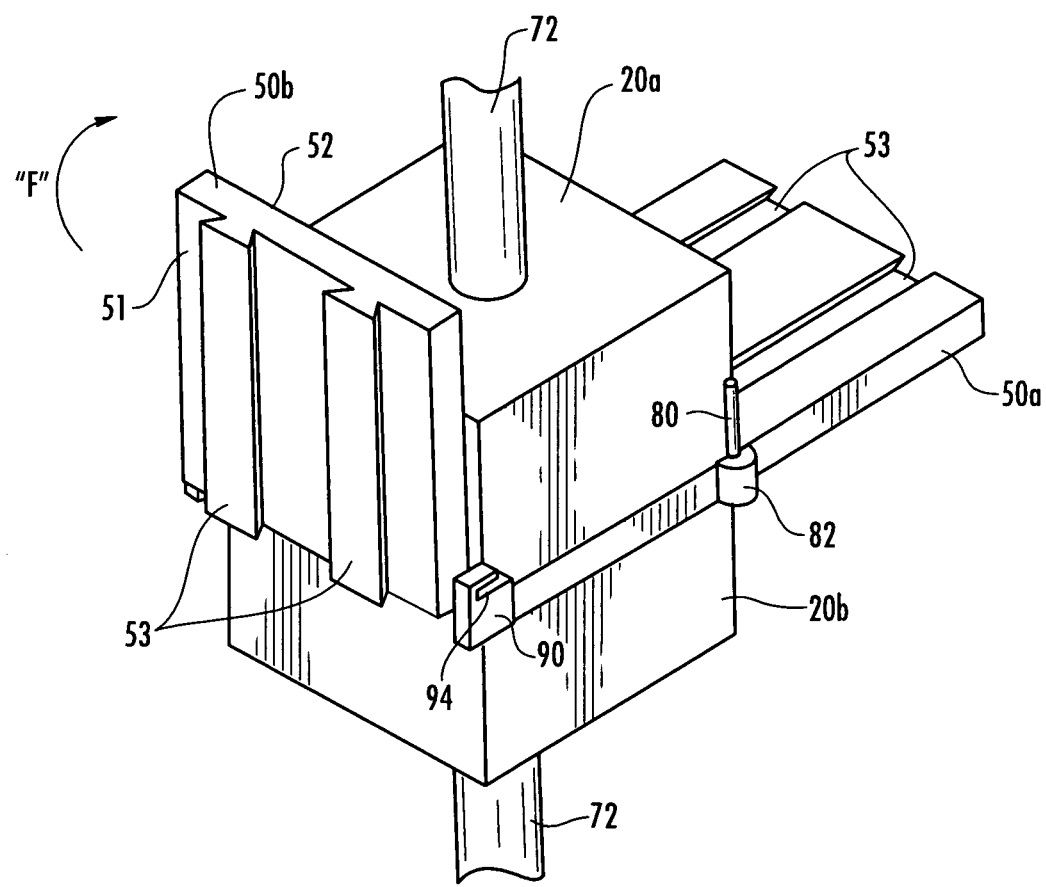
FIG. 17 is a perspective view of the upper and lower cable assemblies and covers in the mated position and with the lower cover rotated to a storage position along the upper cable assembly.

Once the lower cover 50b is slid to its mated position so that each guide post 94 is fully seated in its slot 93 and the guide members 53 of the cover have exited the guide member 26 of housing 22, the lower cover 50b is free to rotate about guide posts 94 to a cover storage position depicted in FIG. 17. It should be noted that while the guide posts 94 are fixed to the lower cover 50b and guide blocks 90 are fixed to the lower housing 22b of the lower cable assembly 20b, the lower cover 50b is rotated upward and alongside the upper housing 22a of the upper cable assembly 20a. If desired, the housings 22 and covers 50 could be configured so that the lower cover 50b rotates downward along the lower housing 22b of the lower cable assembly 20b.

Figure 18:
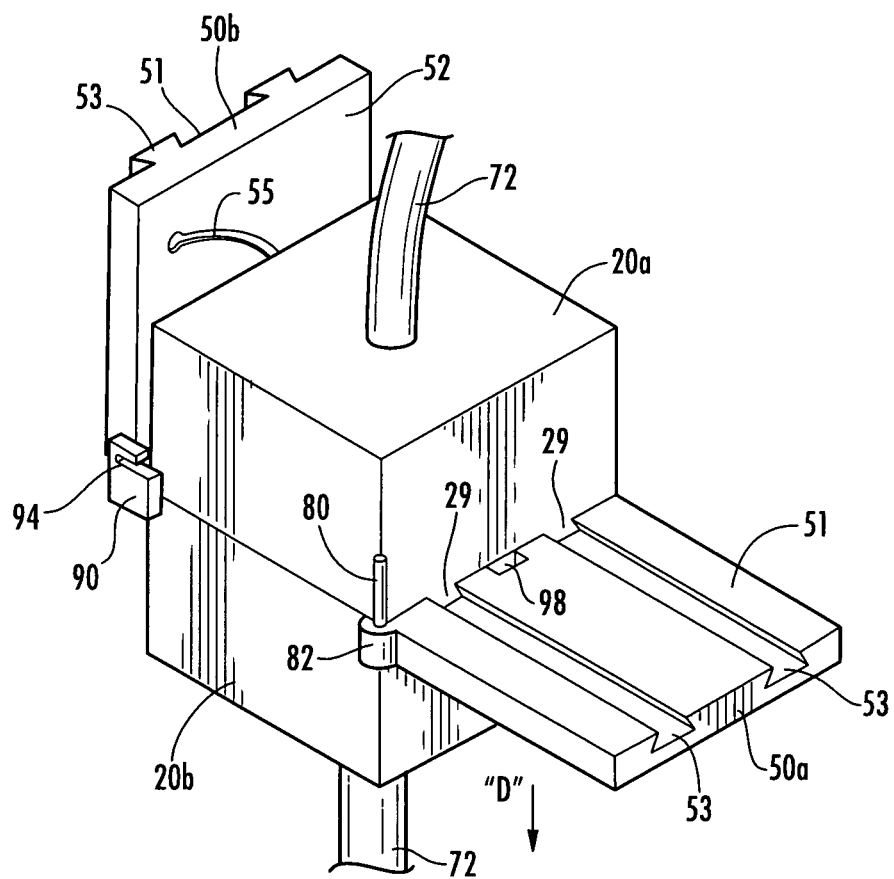
FIG. 18 is a perspective view of the upper and lower cable assemblies and covers in the mated position similar to that of FIG. 17 but rotated 180°.
Figure 19:
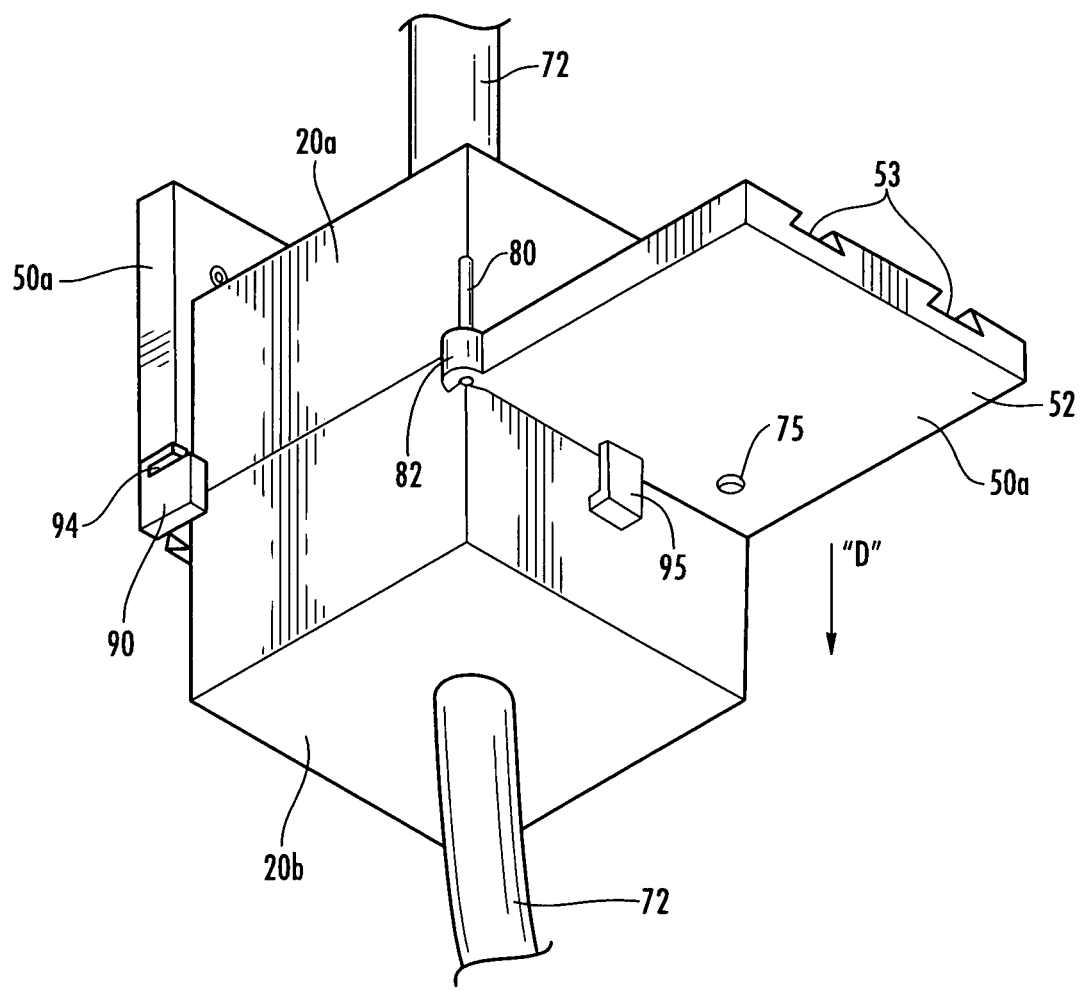
FIG. 19 is a perspective view similar to that of FIG. 18 but taken from a perspective below the assemblies.
Figure 20:
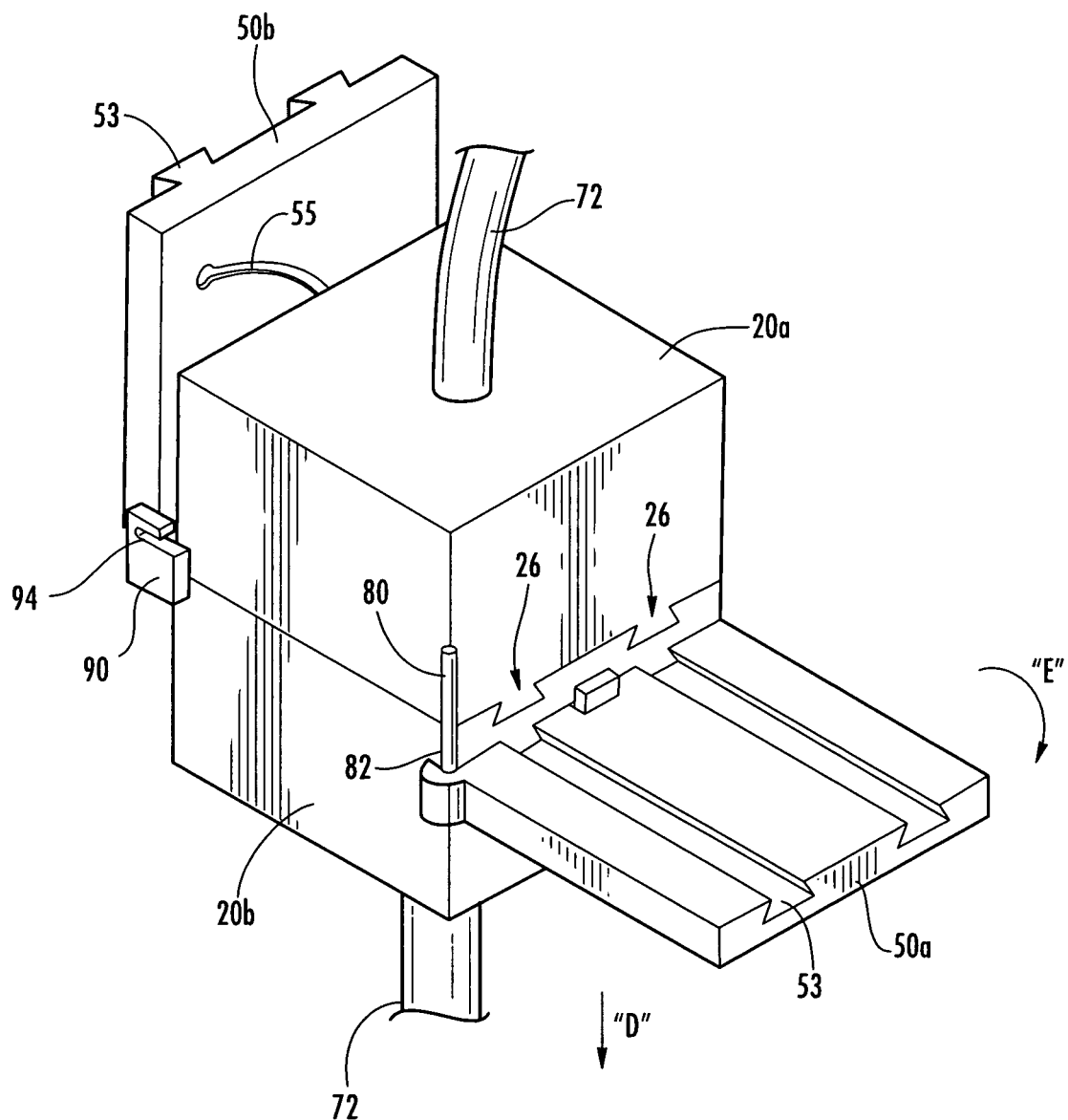
FIG. 20 is a perspective view similar to that of FIG. 18 but with the upper cover slid along downward relative to the cable assemblies.
Figure 21:
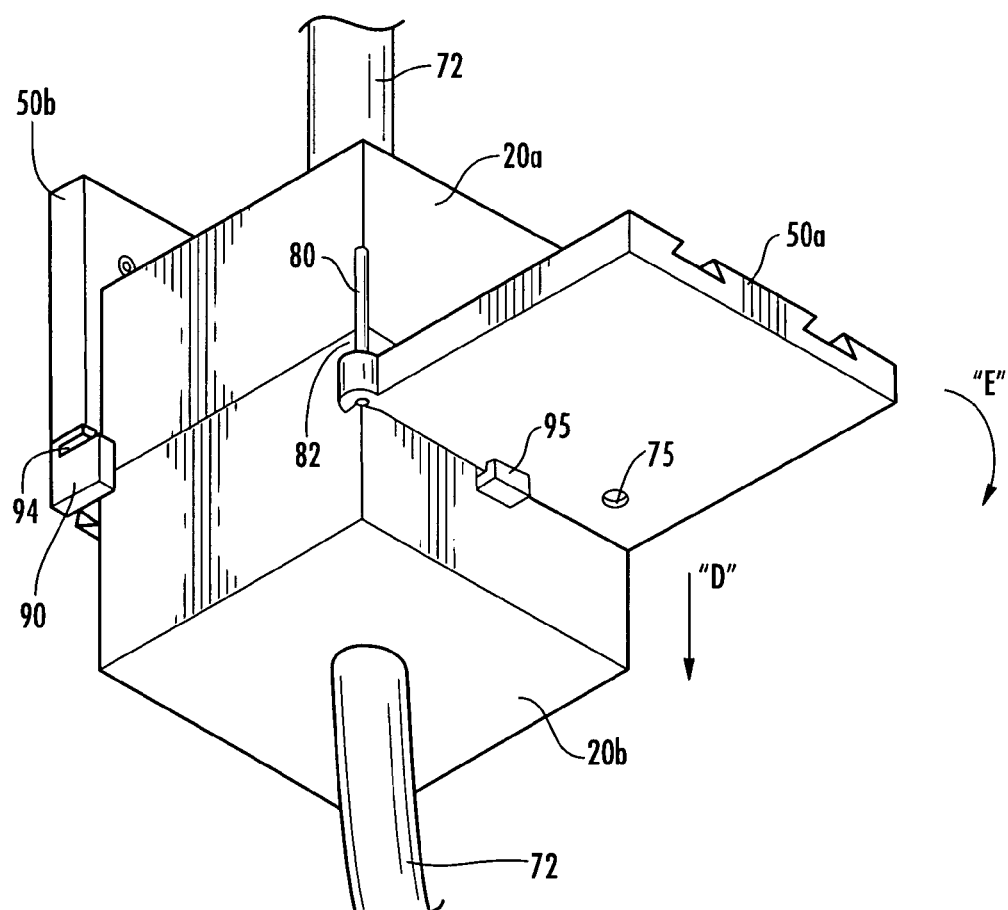
FIG. 21 is a perspective view similar to that of FIG. 20 but taken from a perspective below the assemblies.

Referring to FIGS. 5 and 18-21, another embodiment for securing a cover 50 to the side of a housing 22 is depicted. More specifically, an L-shaped hook 95 extends from an end face 96 of the lower housing 22b of the lower cable assembly 20b and defines a slot 97 that extends along the end face. An opening 98 is centrally located along an edge of the upper cover 50a of the upper cable assembly 20b. A horizontal rod 99 is positioned within the opening 98. The slot 97 and rod 99 are dimensioned so that the rod can slide into slot 97 as depicted in FIGS. 18-21 and rotate therein to the position depicted in FIG. 1. In other words, once the upper and lower cable assemblies 20a, 20b are fully aligned or mated as depicted in FIGS. 18-9, the upper cover 50a is slid downward so that rod 99 is fully slid into slot 97 as depicted in FIGS. 20-1. The upper cover 50a is then rotated downward about rod 99 to be positioned along the housing of the lower cable assembly 20b as depicted in FIG. 1.

Each cover 50 may be secured to the side of one of the housings 22 once adjacent thereto. In one embodiment, one or both of the housing 22 and cover 50 may be manufactured from ferromagnetic materials. In an alternate embodiment, a magnet could be mounted in one or both of the housing 22 and the cover 50 rather than forming the entire component of a ferromagnetic material. Other structures for securing the covers in place could be utilized if desired.

Figure 6:
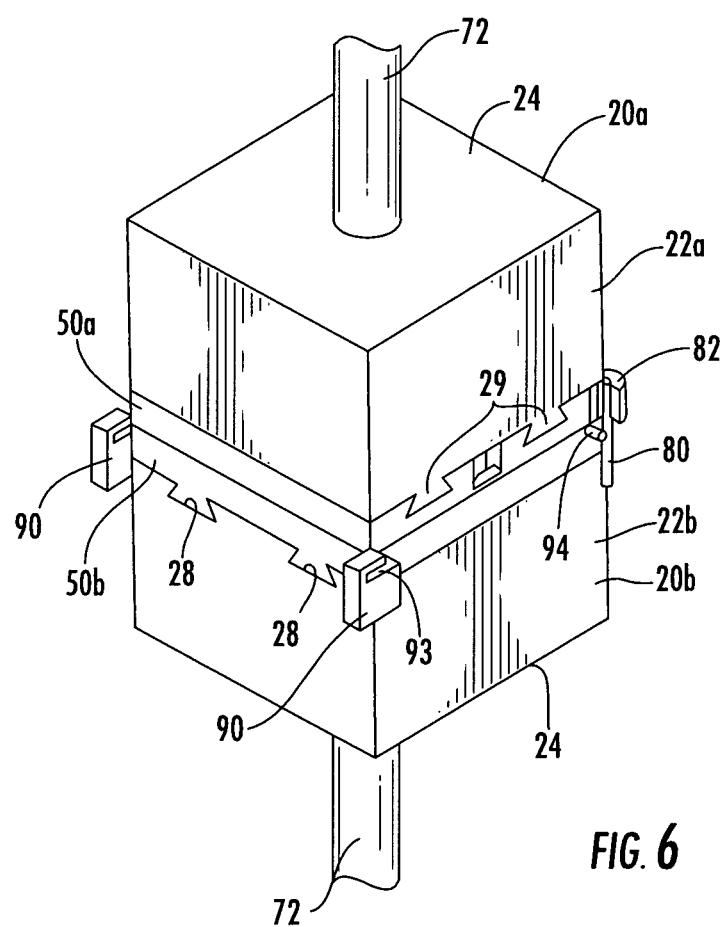
FIG. 6 is a perspective view of the pair of mating cable assemblies and covers of FIG. 5 positioned in a first initial alignment position.

In operation, upper and lower cable assemblies 20a, 20b are provided with upper and lower covers 50a, 50b, respectively, mounted thereon. During mating, the cable assemblies 20 together with their respective covers 50 are initially aligned but spaced apart along a longitudinal or mated axis 30. The cable assemblies 20 and their covers are moved relatively towards each other so that the engagement surfaces 52a, 52b of the covers 50a, 50b abut one another as depicted in FIG. 6. In doing so, the covers 50 are aligned along mated axis 31 with head 76 of bolt 75 that projects from the engagement surface 52a of upper cover 50a aligned with circular opening 58 of arcuate channel 55 within the engagement surface 52b of lower cover 50b. In addition, the housings 22a, 22b of the upper and lower cable assemblies 20a, 20b are aligned along mated axis 31 with the cylindrical guide shaft 80 that extends along sidewall 27 of the lower housing 22b of the lower cable assembly 20b aligned with the semi-cylindrical guide member 82 of the upper cover 50a of the upper cable assembly 20a.

Figure 7:
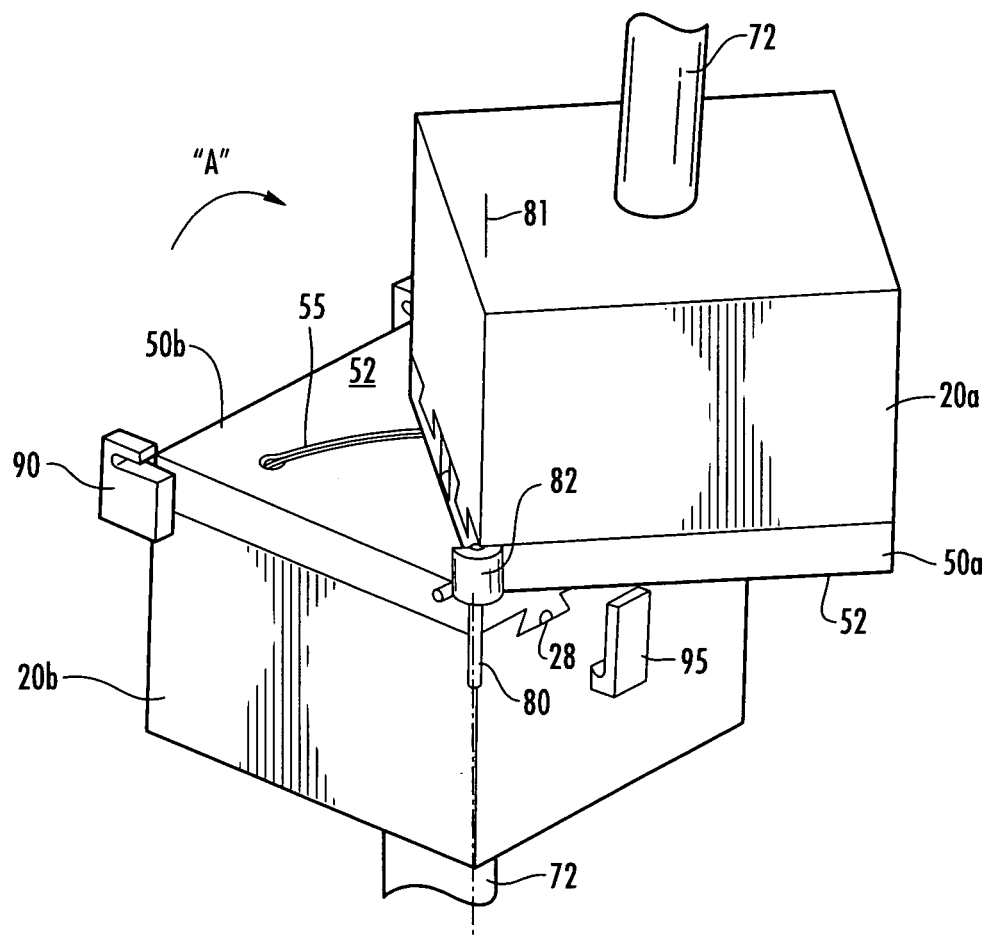
FIG. 7 is a perspective view of the pair of mating cable assemblies and cover of FIG. 6 with the upper cable assembly and cover partially rotated from the position depicted in FIG. 6.

Once the cable assemblies 20 and covers 50 are aligned and positioned with the engagement surfaces 52a, 52b of the upper and lower covers 50a, 50b, abutting one another as depicted in FIG. 6, the cable assemblies and covers are rotated in the direction "A," as shown in FIG. 7, until there has been ninety degrees of relative rotation, as depicted in FIG. 8. More specifically, in FIG. 7, upper cable assembly 20a and upper cover 50a have been rotated approximately forty-five degrees about axis 81 through cylindrical guide shaft 80. In doing so, guide shaft 80 rotates about axis 81 within semi-cylindrical guide member 82 and head 76 of bolt 75 slides within arcuate channel 55. At approximately ninety degrees of relative rotation as depicted in FIG. 8, head 76 of bolt 75 exits channel 55 along exit edge 57 of upper cover 50a. During the rotation from FIGS. 6 to 8, the axes through the upper and lower cable assemblies 20a, 20b remain parallel to mated axis 31.

As best seen in FIG. 8, cylindrical guide shaft 80 remains within semi-cylindrical guide member 82 while the upper and lower cable assemblies 20a, 20b together with their respective covers 50a, 50b are laterally offset. The upper cable assembly 20a and upper cover 50a are then slid relative to the lower cable assembly 20b and lower cover 50b in the direction "B" (which is generally parallel to the axis 81 through cylindrical guide shaft 80) a distance equal to the thickness of the upper and lower covers 50a, 50b. This results in the mating faces 23a, 23b of the upper and lower cable assemblies 20a, 20b lying in a common plane. The interaction of the cylindrical guide shaft 80 with guide member 82 results in the alignment of the sliding guide members 26 of the upper and lower cable assemblies 20a, 20b. In addition, a portion 27a of the sidewall 27 of the upper cable assembly adjacent the mating face 23 is positioned adjacent an edge of the lower cover 50b and a portion 27a of the sidewall 27 of the lower cable assembly adjacent the mating face 23 is positioned adjacent an edge of the upper cover 50a.

Figure 10:
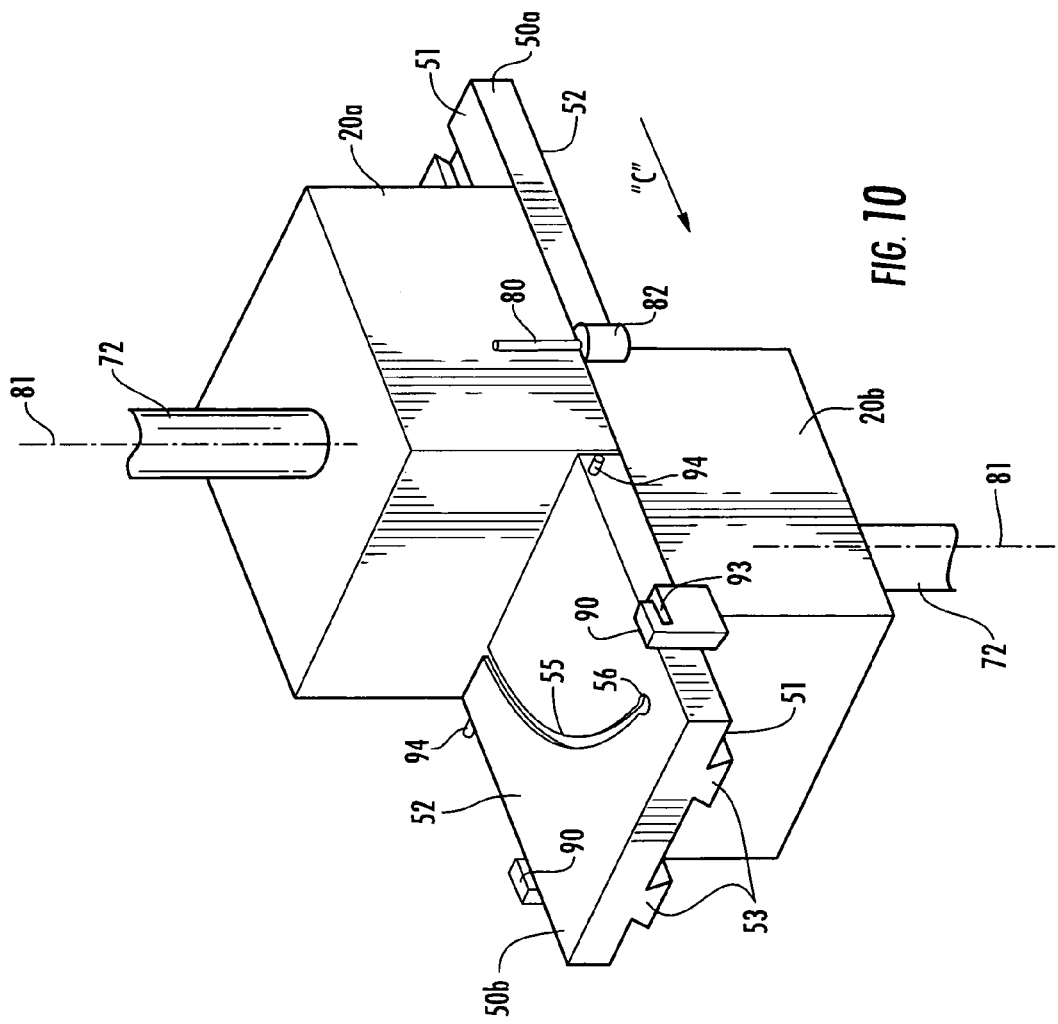
FIG. 10 is a perspective view of the pair cable assemblies and covers with the upper cable assembly slid partway across the lower cable assembly.

The alignment of the sliding guide members 26 permits the upper and lower cable assemblies 20a, 20b to be slid laterally in the direction "C" from the position depicted in FIG. 9 towards the position depicted in FIG. 10. As the upper and lower cable assemblies 20a, 20b are slid laterally, the aligned dovetail channels 28 of the lower housing 22b of the lower cable assembly 20b slidingly receive the dovetail projections 29 of the upper housing 22a of the upper cable assembly 20a. The engagement between the sliding guide members 26 of the upper and lower cable assemblies 20a, 20b accurately guides the sliding movement of the two housings 22a, 22b and minimizes the likelihood that undesirable foreign materials of a significant size will enter the mating interface between the upper and lower cable assemblies.

Due to the alignment and positioning of the upper and lower covers 50a, 50b, sliding of the cable assemblies 20a, 20b relative to each other causes portion 27a of sidewall 27 of the upper cable assembly 20a to engage an edge of the lower cover 50b and slide the lower cover 50b off of the lower cable assembly 20b while portion 27a of sidewall 27 of the lower cable assembly 20b engages an edge of the upper cover 50a and slides the upper cover 50a off of the upper cable assembly 20a. In other words, as the upper and lower cable assemblies 20a, 20b are slid laterally so that their mating axes are aligned with mated axis 31, the upper and lower covers 50a, 50b are also simultaneously slid laterally off of their respective cable assemblies.

By limiting the space between the front face 46 of lens plate 45 and the interface surface 51 of cover 50 to a predetermined distance (e.g., 10% of the spot size of the expanded beam), the size of foreign objects that may enter such space during handling of the cable assembly 20 prior to mating is limited. In other words, mounting of the cover 50 on the mating interface 23 will provide a level of sealing functionality by preventing objects greater than a predetermined size from entering the space between the front face 46 and the interface surface 51. Once mated, the small distance between the lens plates 45 also prevents foreign objects greater than a predetermined size from entering the interface between the lens plates and disrupting the expanded beam light transmission. By simultaneously mating the housings 22 together while sliding the covers 50 off each housing, the likelihood of any foreign objects contaminating the optical interface is minimized. Through such a configuration, the cable assemblies 20 are sealed from foreign objects larger than a predetermined size without the expense and complexity of a sealing system that will keep all foreign objects away from the optical interface.

Once the upper and lower cable assemblies 20a, 20b are aligned, as depicted in FIG. 11, the cable assemblies are fully mated and the lens elements of each cable assembly are aligned. The upper cover 50a may be slid downward in the direction "D" and rotated downward in the direction "E" along the sidewall of the lower cable assembly 20b. The lower cover 50b may be rotated upward in the direction "F" (FIG. 17) along the sidewall of the upper cable assembly 20a.

Although the assemblies 20 are depicted as optical fiber cable assemblies, the principles herein may be applicable to a hybrid assembly including both optical fiber connections and electrical connections. In some applications, the principles may be used with applications having only electrical connections. Still further, the principles herein may be used with connections other than cable assemblies. In addition, the optical fiber connections may be made without the expanded beam elements, if desired. Additionally, recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

While a preferred embodiment of the Present Disclosure is shown and described, it is envisioned that those skilled in the art may devise various modifications without departing from the spirit and scope of the foregoing Description and the appended Claims.

What is claimed is:

1. An assembly, the assembly comprising:
   a first cable assembly, the first cable assembly including a first housing with a first mating face, a first ferrule having a plurality of first optical fibers positioned therein, and a first beam expanding element generally aligned with each first optical fiber, each first beam expanding element expanding an optical beam generally to a beam diameter, and a first retention member; and
   a second cable assembly, the second cable assembly including a second housing with a second mating face, a second ferrule having a plurality of second optical fibers positioned therein, a second beam expanding element generally aligned with each second optical fiber, and a second retention member, each second beam expanding element expanding an optical beam generally to the beam diameter, the second retention member interacting with the first retention member to retain the first cable assembly to the second cable assembly with the first mating face, the second mating face being positioned a distance apart no more than approximately 25% of the beam diameter and permit sliding movement of the first cable assembly relative to the second cable assembly.

2. The assembly of claim 1, wherein the first cable assembly slides relative to the second cable assembly upon mating of the first cable assembly and the second cable assembly.

3. The assembly of claim 2, further including a first cover mounted on the first housing and a second cover mounted on the second housing, upon mounting each cover on its respective mating face, each cover is positioned from its respective mating face a distance no more than approximately 25% of the beam diameter.

4. The assembly of claim 1, further including a first cover mounted on the first housing and a second cover mounted on the second housing, upon mounting each cover on its respective mating face, each cover is positioned from its respective mating face a distance no more than approximately 25% of the beam diameter.

5. The assembly of claim 4, wherein the first cover is slidably mounted on the first housing adjacent the first mating face, and the second cover is slidably mounted on the second housing adjacent the second mating face.

6. The assembly of claim 5, wherein the first housing includes a first housing guide, the second housing includes a second housing guide, the first cover includes a first cover guide and the second cover includes a second cover guide, the first housing guide and the first cover guide interacting to guide sliding movement of the first cover relative to the first housing, the second housing guide and the second cover guide interacting to guide sliding movement of the second cover relative to the second housings, and the first housing guide and the second housing guide interacting to guide sliding movement of the first housing relative to the second housing.

7. The assembly of claim 6, wherein the first and second housing guides and the first and second cover guides are each configured to slidingly engage in a linear manner.

8. The assembly of claim 1, wherein the first cable assembly further includes a first electrical interface, and the second cable assembly further includes a second electrical interface, the first and second electrical interface being mateable.

9. The assembly of claim 1, wherein the second mating face is positioned a distance apart no more than a fraction of the beam diameter that would permit particulate matter of a magnitude that would not substantially occlude the optical signal and permit sliding movement of the first cable assembly relative to the second cable assembly.

10. The assembly of claim 9, wherein the fraction is 25%.

* * * * *